United States Patent [19]

Marschke

[11] Patent Number: 5,466,329
[45] Date of Patent: Nov. 14, 1995

[54] ADJUSTABLE BALLAST SYSTEM FOR THE HOLDDOWN BELT IN A DOUBLE FACER

[75] Inventor: Carl R. Marschke, Phillips, Wis.

[73] Assignee: Marquip, Inc., Phillips, Wis.

[21] Appl. No.: 253,647

[22] Filed: Jun. 3, 1994

[51] Int. Cl.⁶ .................. B31F 1/20; B31F 1/24
[52] U.S. Cl. .......... 156/470; 156/210; 156/583.3; 156/583.5; 156/583.91; 100/211
[58] Field of Search ................ 156/470, 459, 156/583.3, 583.5, 583.91, 205, 210, 580, 443, 543, 555, 583.4; 100/211

[56] References Cited

U.S. PATENT DOCUMENTS

| | | |
|---|---|---|
| 3,319,353 | 5/1967 | Matsunami et al. . |
| 3,580,795 | 5/1971 | Eichenlaub ................ 156/285 |
| 3,607,523 | 9/1971 | McGirr . |
| 3,676,268 | 7/1972 | Brandenburg et al. . |
| 3,753,838 | 8/1973 | Brandenburg . |
| 3,829,338 | 8/1974 | Hayasi et al. .............. 156/470 |
| 4,049,485 | 9/1977 | Iversen . |
| 5,005,473 | 4/1991 | Ishibashi .................... 156/583.5 |
| 5,256,240 | 10/1993 | Shortt . |
| 5,360,506 | 11/1994 | Thomas ..................... 156/470 |

*Primary Examiner*—Michele K. Yoder
*Attorney, Agent, or Firm*—Andrus, Sceales, Starke & Sawall

[57] ABSTRACT

A variable load ballast system for the double facer of a corrugator includes a number of rows of holddown belt engaging ballast members positioned in side-by-side relation transversely across the belt, with the rows extending over the full heating section of the double facer. Each of the rows is divided into a number of longitudinal segments, each of which segments is controlled by a vertical actuator to move the segment between a lower full load ballast position on the belt and an upper no load position off the belt. The rows may comprise a series of ballast rollers or a continuous flexible membrane and either embodiment provides the ability to vary the ballast load on the holddown belt longitudinally, laterally and in any pattern of symmetry or asymmetry to accommodate a wide range of operating conditions and problems typically arising in the operation of a double facer.

8 Claims, 5 Drawing Sheets

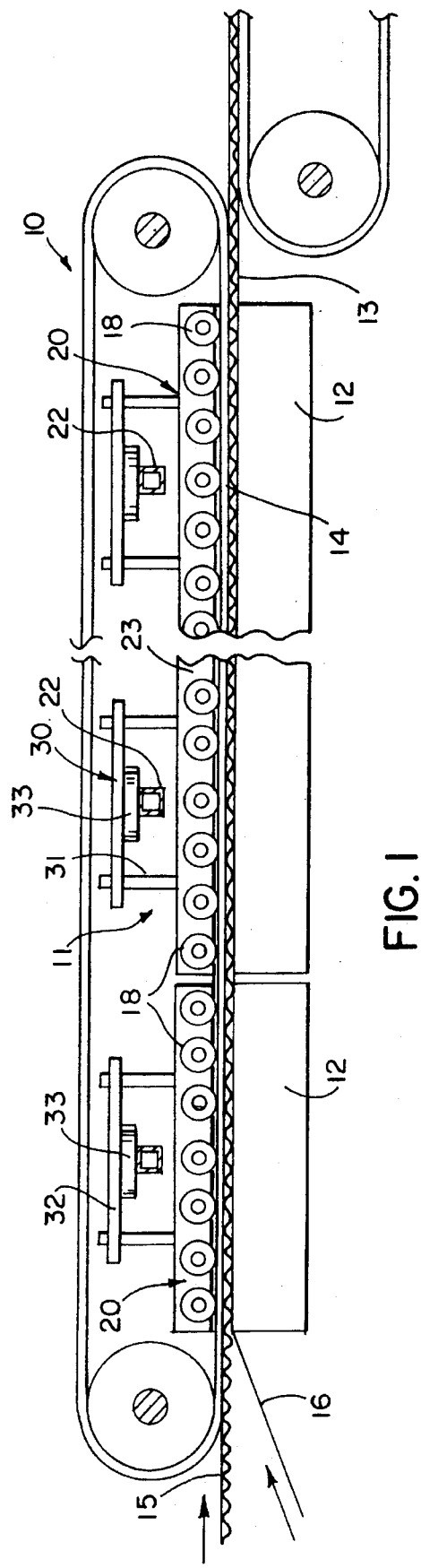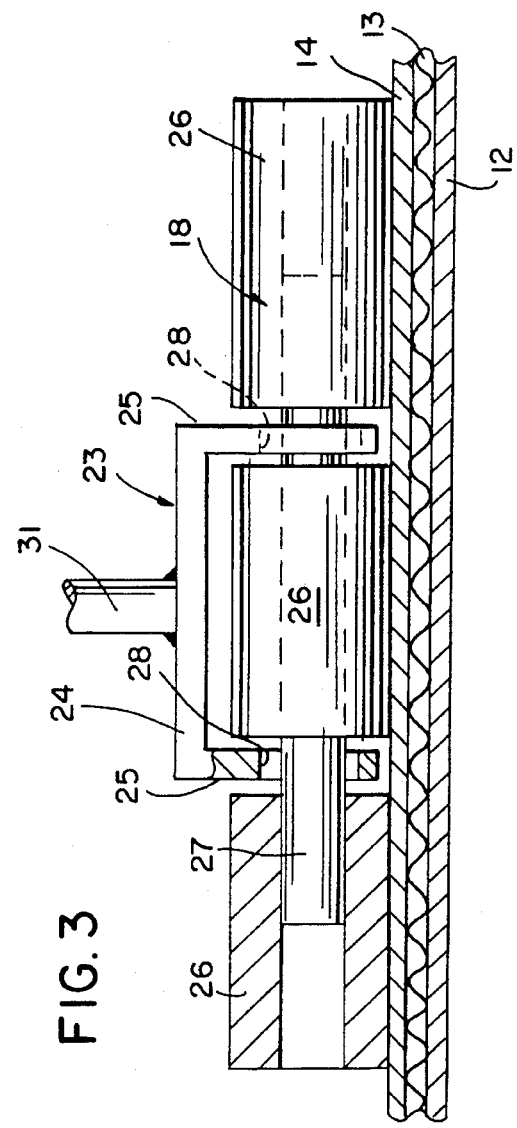
FIG. 1
FIG. 3

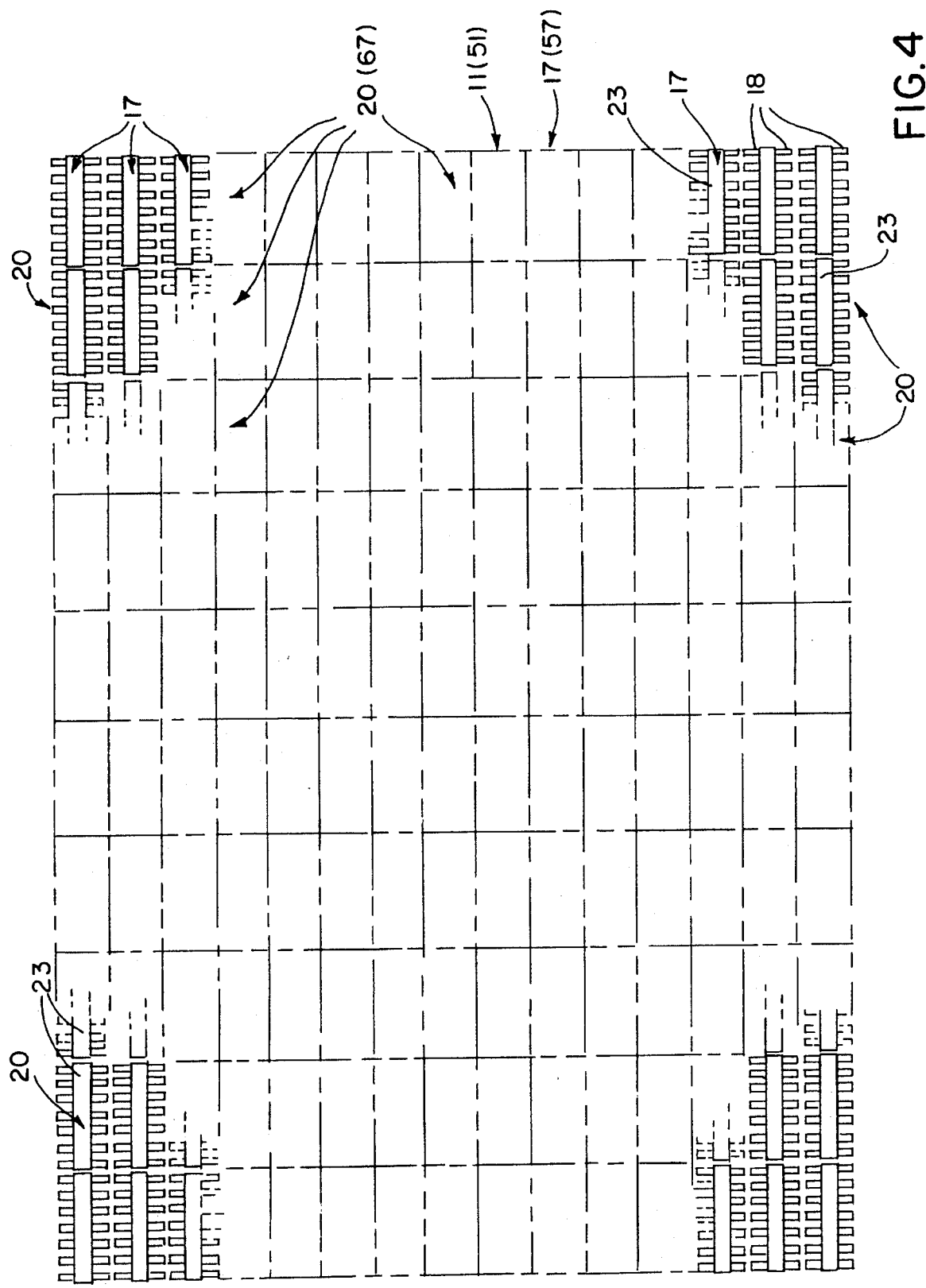

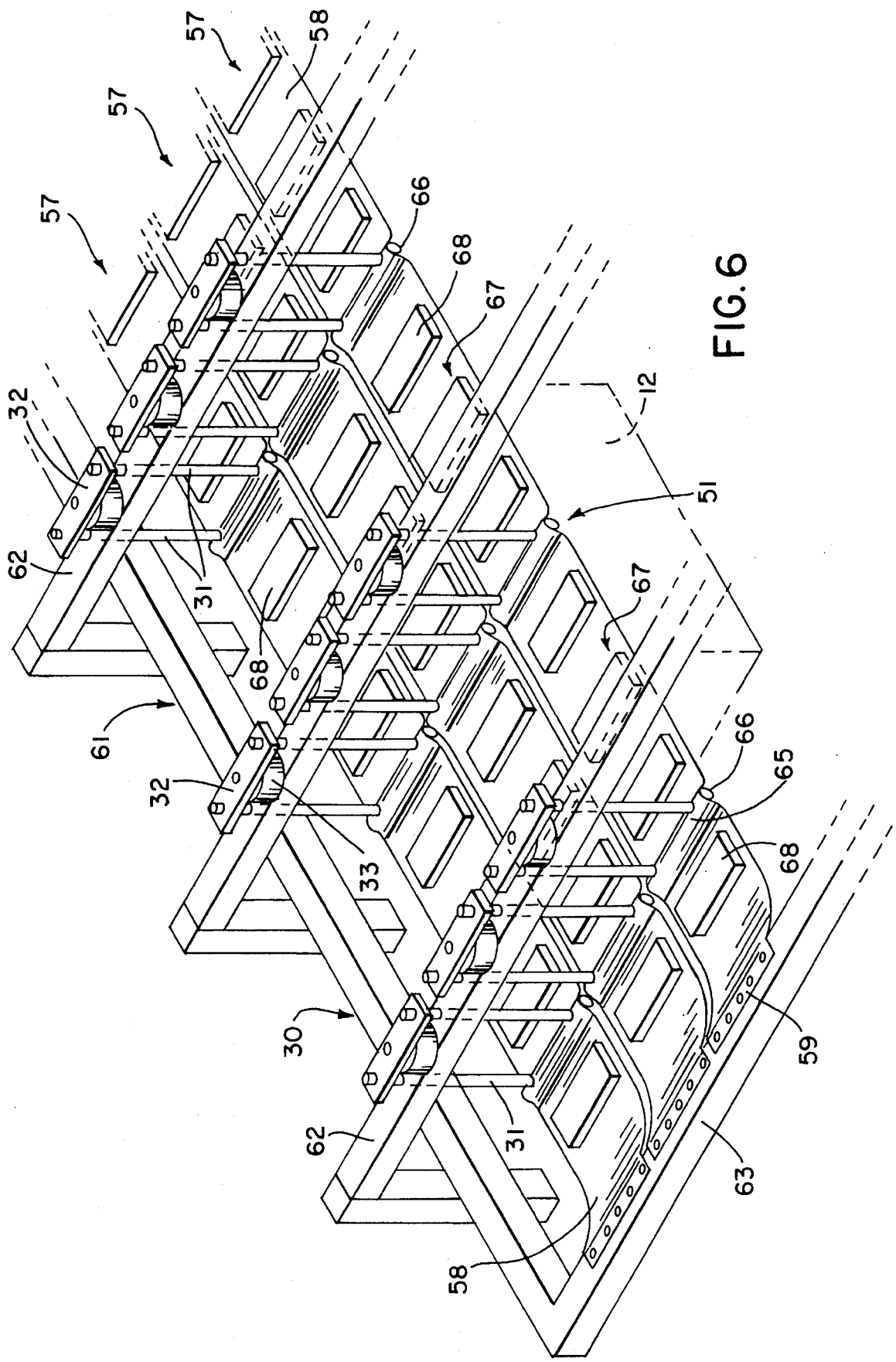

ADJUSTABLE BALLAST SYSTEM FOR THE HOLDDOWN BELT IN A DOUBLE FACER

BACKGROUND OF THE INVENTION

The present invention relates to an apparatus for the manufacture of corrugated paperboard and, more particularly, to an adjustable ballast system for a holddown belt for a double facer apparatus.

In a typical prior art double facer, a single web is brought into contact with the glued flute tips of a single face corrugated web and the freshly glued double face web is passed over the surfaces of a number of serially arranged hot plates to cause the starch-based glue to set. Double face web travel over the hot plates is provided by a wide driven holddown belt in direct contact with the upper face of the corrugated web, and the outer face of the belt is held in contact with the web by a series of ballast rollers or the like, all in a well known manner.

For a number of reasons, it is desirable to provide some means for varying the vertical ballast load imposed on the holddown belt, both longitudinally in the direction of belt and web movement through the double facer and laterally across the width of the belt and web. As the three paper web components comprising a double face corrugated web vary in quality and/or web thickness from one run of corrugated board to another or as double or triple wall board consisting of 2 or 3 single face webs and a bottom liner, more or less heat may be required to be applied in the double facer and, as a result, more or less ballast weight applied to the holddown belt. Variations in the speed at which the web is run may also require variations in ballast in the longitudinal direction of the web. Lateral variations in the holddown ballast across the width of the web may be desirable to compensate for the actual web width being run or because of variations in the moisture content of web components across the width of the web. Furthermore, combinations of the foregoing factors may make it desirable to simultaneously vary the holddown ballast loading both longitudinally and laterally in the double facer.

U.S. Pat. Nos. 3,676,268 and 3,753,838 both disclose systems for controlling the weight of ballast rollers positioned over the holddown belt in a double facer. The earlier patent provides rows of individual rollers extending laterally of the web (or in the cross machine direction) with several rows of rollers commonly mounted over an individual heating plate for movement together into and out of contact with the holddown belt. In addition, each roller in the group is mounted on its own vertical fluid actuator for individual positioning to vary the load imposed by the roller on the belt. The later patent utilizes parallel beams which are spaced across the width of the belt, with each beam carrying a row of rollers spaced in the direction of web movement and extending over the surfaces of a number of adjacent heating plates. Each roller is individually mounted and spring biased against the belt and each beam is independently adjustable to vary the vertical position of each row of rollers.

Other arrangements for applying variable ballast pressure to the holddown belt in a double facer are shown, for example, in U.S. Pat. No. 3,319,353 in which air pressure from overhead plenums holds the belt against the face of the corrugated web; in U.S. Pat. No. 3,607,523 in which full web width ballast rolls are lifted off the holddown belt automatically as the hot plates or steam chests pivot down and out of contact with the underside of the corrugated web; in U.S. Pat. No. 5,256,240 which utilizes pressurized air bladders to compensate for surface distortion in the supporting hot plates; and, in U.S. Pat. No. 4,049,485 where ballast roll pressure is controlled and uniformly varied along the whole heating section by a common linear actuator operating against the force of adjustable bias springs.

SUMMARY OF THE INVENTION

In accordance with the present invention, a system for selectively varying the vertical ballast load applied to the upper surface of the moving holddown belt and the underlying corrugated paperboard web traveling therewith over a plurality of heating units in a double facer includes a plurality of rows of belt engaging ballast members, each of which rows extends over the heating units with the plurality of rows positioned in parallel side-by-side relation transversely across the belt and the underlying corrugated web, and further includes a vertical actuator for each segment of a row which segment overlies a heating unit, the actuator being operable to move each segment between a lower full load ballast position and an upper no load position.

In a preferred embodiment of the invention, the system includes a support structure which overlies the belt and the heating units and each row of belt engaging ballast members comprises a continuous flexible membrane, a series of membrane support members which are spaced along the membrane and define the segments of the row, the upstream end of the membrane being attached to the support structure, and each of the actuators being mounted on the support structure and including a vertically positionable link which is operatively connected to a membrane support member. Each membrane support member comprises a horizontal rod section which is positioned below the membrane and within an upwardly extending corrugation formed transversely across the membrane. Ballast load elements are placed atop each of the membrane segments.

A second embodiment of the system of the present invention also includes a support structure which overlies the belt and the heating units and, in this embodiment, each row comprises a series of rollers each of which is fixed to a horizontal transversely extending roller shaft, an intermediate horizontal support arm extends over each heating unit and supports a set of the series of rollers, with each roller set comprising a segment of the row. The support arm includes pairs of oversize laterally spaced openings within each of which are received portions of a roller shaft. Each of the actuators is mounted on the support structure and includes a vertically positionable link operatively connected to a support arm such that, in the lower full load position, the shafts of the roller set comprising the segment are vertically unsupported in the support arm openings and the rollers rest on the belt and, in the upper no load position, the shafts of the roller set are supported in said openings and the rollers are spaced above the belt. Preferably, the support arms each comprise a downwardly opening channel section which includes a horizontal central web interconnecting a pair of downwardly depending legs. The pairs of oversized openings are formed in the legs of the channel section and preferably comprise vertically elongated slots. In the preferred construction of this embodiment, each roller comprises three roller units, including a center unit positioned within the channel section between the legs thereof and a pair of outboard roller units positioned outside the channel section adjacent the channel legs.

BRIEF DESCRIPTION OF THE DRAWINGS

FIG. 1 is a generally schematic side elevation of a double backer utilizing the ballast system of one embodiment of the present invention.

FIG. 3 is an enlarged partial section taken on line 3—3 of FIG. 2.

FIG. 4 is a top plan schematic view of the ballast system of the present invention.

FIG. 6 is a perspective view of a portion of the system shown in FIG. 5.

DETAILED DESCRIPTION OF THE PREFERRED EMBODIMENTS

Figure 2:
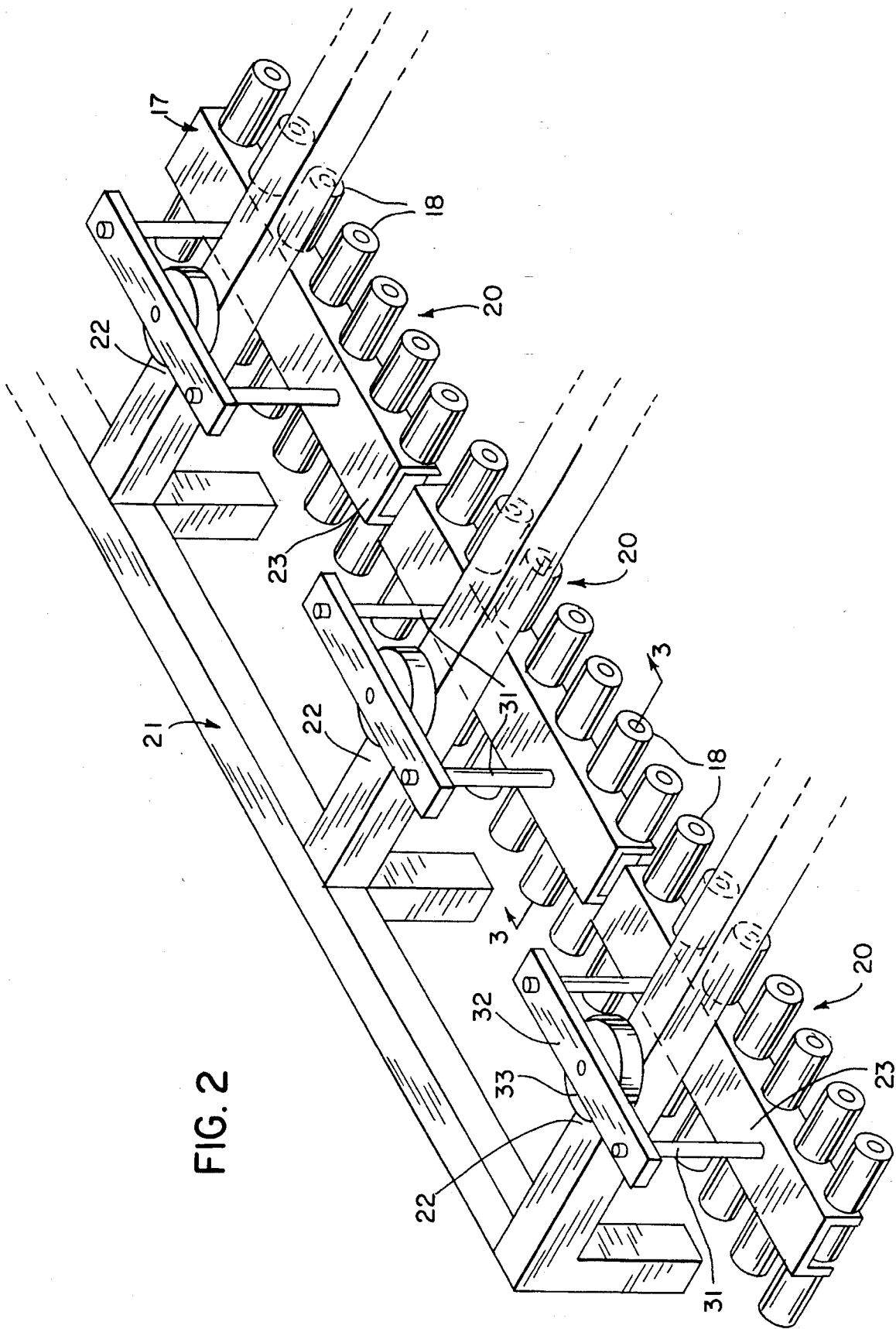
FIG. 2 is a perspective view of a portion of the system shown in FIG. 1.

Referring first to FIG. 1, a double facer 10 of generally conventional construction is shown schematically and includes a variable load ballast system 11 constructed in accordance with one embodiment of the subject invention. The double facer heating section includes a series of heating units comprising steam chests or hot plates 12 which together provide a flat, substantially continuous heated surface over which the double face corrugated web 13 is conveyed by a holddown belt 14 which is pressed against the web 13 by operation of the ballast system 11. The heat and pressure provided in the double facer cause the starch-based adhesive, by which the three component webs of the double face web 13 is formed, to gel and set. In upstream operations, not shown, a corrugated medium is glued to a facing web to form a single face corrugated web 15 and, upon entry into the double facer, another facing web 16 is brought into contact with the exposed adhesive coated flute tips of the single face web to form the double face web 13, as shown in FIG. 1.

As explained above, a number of operational problems or variations make it desirable to impose a variable force on the holddown belt 14 and thus to the double face web 13 traveling over the hot plates 12. These problems and variations include thermal expansion resulting in distortion of the horizontal supporting surface defined by the hot plates 12, variations in the quality and size of the component webs making up the double face web 13, variations in moisture content across the width of the web, and the speed at which the corrugator system is being operated.

Referring also to FIGS. 2 and 3, the ballast system 11 includes a plurality of parallel rows 17 of rollers 18, each of which extends over the full length of the series of hot plates 12. The rollers 18 are of small diameter, such as 1", and of an axial length of, for example, 5⅞". The rollers are closely spaced in each row with a spacing of 1" or so between the cylindrical surfaces of adjacent rollers 18. Enough rows 17 of rollers are provided to span the width of the maximum width double face web 13 capable of being processed in the double facer 10. Thus, for a 96" web, 16 rows 17 of rollers with the ends of rollers in adjacent rows spaced by about ¼" would be required.

Each row 17 of rollers is separated longitudinally into a series of segments 20. Each segment of rollers preferably extends the length in the longitudinal direction (or direction of web movement) equal to the length of one hot plate 12. Thus, with an 18" machine direction length of a hot plate, a roller segment 20 might comprise 10 rollers spaced from one another by about 1". However, variations in the size of the hot plates or steam chests, roller size and spacing, and the like may dictate many variations in the make-up of a roller segment. An overhead support structure 21 includes a series of transverse support members 22 which span the double facer unit and are spaced longitudinally in the direction of web movement approximately equal to the spacing of the steam chests or hot plates 12. Preferably, each transverse support member is centered in the longitudinal direction over a steam chest, but the longitudinal positioning and spacing of the support members 22 may be varied as desired.

Each roller segment 20 is supported by an individual support arm 23 positioned below and extending generally perpendicular to an overhead support member 22. Each support arm 23 comprises a channel section including a horizontal central web 24 interconnecting a pair of downwardly depending legs 25. Each support arm 23 is approximately as long as one roller segment or as long as a steam chest or hot plate 12.

Each of the rollers 18 preferably comprises a three unit assembly with each of the three roller units 26 fixedly attached to a common roller shaft 27. Each of the roller units is preferably made of a suitable metal, but can be made of any material having sufficient mass to provide the desired ballast load when the rollers are resting on the holddown belt 14. The roller support arm 23 includes a number of spaced pairs of vertically elongated slots 28 formed in the channel legs 25 which are adapted to receive and support the shaft 26 of each roller 18. Each of the slots 28 has a width just slightly larger than the diameter of the shaft 27 and a vertical length substantially greater so as to allow vertical sliding movement of the shaft in the slot.

Each support arm 23 is mounted for vertical movement between the belt 14 and the upper support member 22 by an actuator mechanism 30 operatively connecting the support arm to the overhead support member. Each actuator mechanism includes a pair of vertically extending tie rods 31 having their lower ends secured in the central web 24 of the support arm 23 and extending upwardly above the support member 22 with the upper ends of the tie rods secured in the ends of a horizontal bracket 32. The bracket 32 spans the support member 22 and is supported over the top of the support member by a bellows-type air bag 33. The air bag 33 has a relatively short stroke such that, when inflated, vertical upward movement of the bracket 32 and tie rods 31 initially lifts the support arm 23 and, when the roller shafts 27 bottom in the slots 28, all of the rollers in the segment 20 carried by the support arm are also lifted off the holddown belt 14. When the air bag 33 is deflated by release of the air pressure, the components of the actuator mechanism 30 are dimensioned to lower the support arm 23 to a position in which the rollers 18 are resting with their full dead weights on the belt and the roller shafts 27 are floating in the slots 28 between the upper and lower ends thereof. In this manner, there is no vertical bearing load on the roller shafts 27 as the rollers rotate from belt movement. The horizontal bearing loads imposed by the shafts bearing against the vertical downstream sides of the slots is minimal since the slots need only act as retainers to prevent downstream movement of the roller assemblies. In addition, the support arm channels 23 may be constructed of a tough plastic material such as ultra high molecular weight polyethylene extrusions, lessening the weight imposed on the actuator mechanism 30.

Referring briefly to FIG. 4, showing a schematic top plan view of the ballast system 11 of the preceding embodiment as well as the ballast system 51 of the embodiment to be described, the gridwork of segments 20 or 67 each of which can be positioned vertically between a full ballast load and a no load position, provides a virtually limitless ballast load and heating profile to be attained through the double facer 10. The load and heating profiles may be varied longitudinally in the direction of web movement, laterally across the width of the web, and in either a symmetric or asymmetric pattern.

Figure 5:
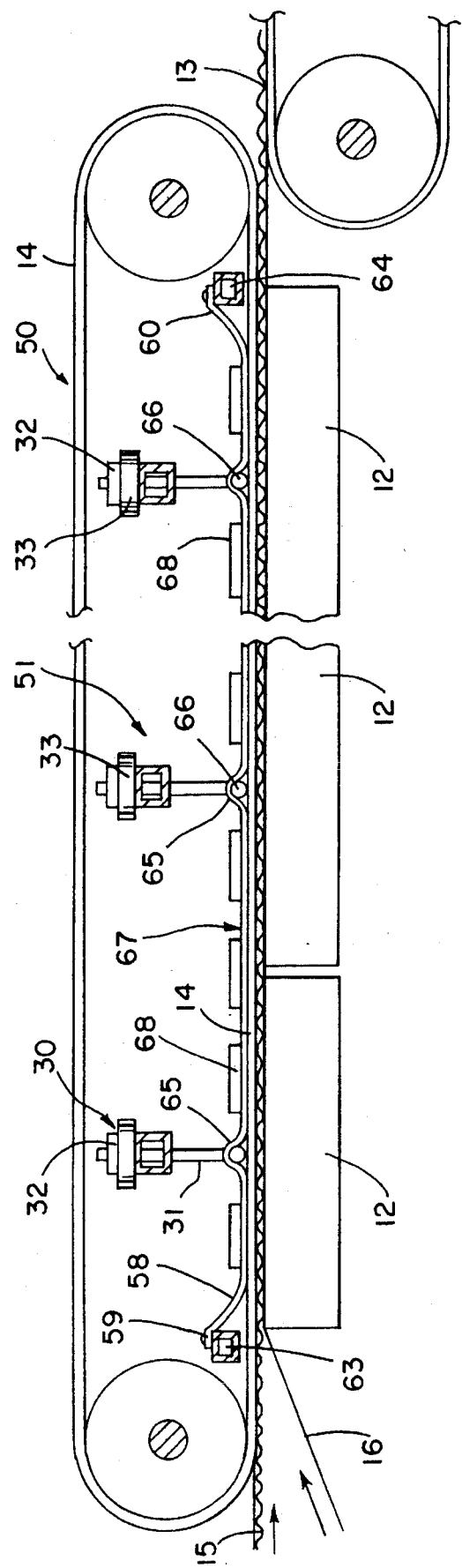
FIG. 5 is a schematic side elevation of the presently preferred embodiment of the ballast load control system of the present invention.

Referring now to the embodiment shown in FIGS. 5 and 6 which constitutes the presently preferred embodiment of the invention, the ballast system 51 functions nearly identically to the ballast system 11 of the previously described embodiment from the standpoint of providing the ability to widely vary the holddown pattern and thus the pattern of heating supplied to the web 13 from the underlying hot plates or steam chests. In this embodiment, the belt engaging ballast members comprise parallel rows 57 of continuous narrow membranes 58. Each of the membranes 58 is constructed of a flexible stainless steel sheet having a thickness of, for example, 0.008 inch. The membrane 58 may have a width of about 5⅞" (corresponding to the width of a row of rollers in the previous embodiment) and a length running the full length of the heating section of the double facer 50. An overhead support structure 61 includes an upstream cross member 63 to which the upstream end 59 of the membrane is attached, and a downstream cross member 64 to which the downstream end 60 of the membrane is attached. The catenary in the flexible membrane 58 permits most of the length thereof to sag into contact with the holddown belt 14 over the full length of the heating section. The membrane 58 is formed with a series of equally spaced corrugations 65 extending transversely across the membrane and spaced longitudinally to correspond to the length in the machine direction of a heating unit or steam chest. A horizontal rod section 66 is positioned within each corrugation 65 on the underside of the membrane and includes a pair of spaced suitably tapped connections (not shown) into which the lower ends of a pair of vertical tie rods 31 are fastened. The tie rods 31 form part of an actuator mechanism 30 which may be identical to that of the previously described embodiment, except for a slight variation in the positioning of the tie rods. Specifically, the rod sections 66 and corresponding corrugations 65 divide the membrane into a series of longitudinal membrane segments 67, each of which segments corresponds functionally to a roller segment 20 of the previously described embodiment. An actuator mechanism 30 is provided for each membrane segment 67 and includes an air bag 33 mounted to the upper side of a lateral support member 62 and operatively attached to a horizontal bracket 32 to which the upper ends of the tie rods 31 are attached. The bracket 32 extends parallel to the support member 62 which is provided with a pair of vertical clearance holes for movement of the tie rods therein.

A number of ballast load elements in the form of discrete rectangular blocks 68 are placed on the upper surface of each membrane segment 67. The ballast blocks may be made of any suitable material which provides a confined mass of suitable weight to provide a desired ballast load. When the air bag 33 is depressurized, the full weight of the membrane segment 67 and ballast blocks 68 bears on the upper surface of the holddown belt 14. When the air bag is pressurized, vertical movement of the tie rods 31 will raise the rod section 66 within the corrugation 65, causing all or a portion of the adjoining membrane segments 67 in both longitudinal directions to lift partially or completely off the belt, depending upon the length of the air bag stroke. Correspondingly, with a steam chest or hot plate 12 centered longitudinally under a support member 62 (as shown in FIG. 6), inflation of the air bag 33 will result in portions of two adjoining membrane segments 67 being lifted from the part of the belt surface in direct operative contact with the surface of the underlying hot plate. However, the positions of the hot plates longitudinally with respect to the support members 62 and actuator mechanisms 30 attached thereto may be varied as desired.

With the ballast system 51 utilizing rows of flexible membranes 58, it would also be possible to utilize air bags 33 controlled with a two level pressure system. At zero pressure, with the air bag deflated, the full weight of the membrane segment or segments is imposed on the holddown belt as previously described. At the maximum pressure setting, the air bag would be fully inflated and lift the membrane segment or adjoining segments, also as indicated. However, with a second level intermediate pressure setting, the air bag could be partially inflated to counter, for example, half of the weight of the membrane and ballast blocks controlled thereby, resulting in an intermediate ballast loading on the belt.

Referring once again to FIG. 5, the membrane segments 67 of this embodiment function essentially the same as the segments 20 of the ballast system 11 previously described. Thus, a longitudinally or laterally varying load and heating pattern may be provided and the pattern may be made symmetric or asymmetric with respect to the longitudinal centerline of the double facer. It is envisioned that the control for either ballast system 11 or 51 could include a monitoring panel patterned after the FIG. 4 schematic with each of the segments 20 or 67 represented by an LED or similar light source controlled by operation of the respective actuator mechanism 30, thereby providing an immediate visual indication of the ballast load and heating pattern applied to the holddown belt and underlying corrugated web.

The entire assembly may be raised as a unit to facilitate belt or hot plate maintenance.

It is also envisions that tie rods 31 may be guided by structure (not shown), such as through a member interconnected to supports 22.

Various modes of carrying out the present invention are contemplated as being within the scope of the following claims particularly pointing out and distinctly claiming the subject matter which is regarded as the invention.

I claim:

1. A system for selectively varying the vertical ballast load applied to an upper surface of a moving holddown belt and an underlying corrugated paperboard web traveling therewith over a plurality of heating units positioned in the direction of web movement in a double facer, said system comprising:

a plurality of rows of belt engaging ballast members, each row extending over the heating units, and said plurality of rows positioned in parallel side-by-side relation transversely across the belt and underlying web;

each row including a plurality of segments, each segment overlying a heating unit and having a length approximately equal to the length of a heating unit;

a vertical actuator for each of said segments, said actuator operable to move each said segment between a lower full load ballast position and an upper no load position independently of any other segment and without altering the load imposed by any other segment on the holddown belt.

2. A system for selectively varying the vertical ballast load applied to an upper surface of a moving holddown belt and an underlying corrugated paperboard web traveling therewith over a plurality of heating units positioned in the direction of web movement in a double facer, said system comprising:

a plurality of rows of belt engaging ballast members, each row extending over the heating units, and said plurality of rows positioned in parallel side-by-side relation transversely across the belt and underlying web;

a vertical actuator for at least some segments of a row which segments overlie a heating unit, said actuator operable to move each said segment between a lower full load ballast position, and an upper no load position;

a support structure overlying the belt and the heating units, and wherein each row includes:

a continuous flexible membrane;

a series of membrane support members spaced along the membrane and defining the segments of the row;

the upstream end of said membrane attached to said support structure; and, each of said actuators mounted on said support structure and including a vertically positionable link operatively connected to a membrane support member.

3. The system as set forth in claim 2 wherein each membrane support member comprises a horizontal rod section positioned below the membrane within an upwardly extending corrugation formed transversely across the membrane.

4. The system as set forth in claim 2 including ballast load elements lying atop each of the membrane segments.

5. The system as set forth in claim 1 including a support structure overlying the belt and the heating units, and wherein each row comprises:

a series of rollers each fixed to a horizontal transversely extending roller shaft;

an intermediate horizontal support arm extending over each heating unit and supporting a set of said series of rollers, each roller set comprising a segment of the row;

said support arm having pairs of oversize laterally spaced openings within each of which are received portions of a roller shaft; and, each of said actuators mounted on the support structure and including a vertically positionable link operatively connected to a support arm such that, in said lower full load position, the shafts of the roller set comprising the segment are vertically unsupported in the support arm openings and the rollers rest on the belt and, in the upper no load position, the shafts of said roller set are supported in said openings and the rollers are spaced above the belt.

6. The system as set forth in claim 5 wherein the support arms each comprise a downwardly opening channel section including a horizontal central web interconnecting a pair of downwardly depending legs.

7. The system as set forth in claim 6 wherein the pairs of oversize openings are formed in the legs of said channel section and comprise vertically elongated slots.

8. The system as set forth in claim 7 wherein each roller comprises three roller units, including a center unit positioned within said channel section between the channel legs and a pair of outboard units positioned outside said channel section adjacent said channel legs.

* * * * *